(12) United States Patent
Ford et al.

(10) Patent No.: US 8,307,429 B2
(45) Date of Patent: Nov. 6, 2012

(54) SYSTEM AND METHOD OF GENERICALLY DETECTING THE PRESENCE OF EMULATED ENVIRONMENTS

(75) Inventors: Richard Ford, Melbourne, FL (US); William Allen, Melbourne, FL (US); Gerald Marin, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 1491 days.

(21) Appl. No.: 11/834,891

(22) Filed: Aug. 7, 2007

(65) Prior Publication Data

US 2008/0147353 A1     Jun. 19, 2008

Related U.S. Application Data

(60) Provisional application No. 60/821,676, filed on Aug. 7, 2006.

(51) Int. Cl.
*G06F 11/00* (2006.01)
(52) U.S. Cl. .......................................... 726/22; 726/25
(58) Field of Classification Search .............. 726/22–26; 713/176, 187–188; 709/217, 220, 223
See application file for complete search history.

(56) References Cited

U.S. PATENT DOCUMENTS

| | | | | |
|---|---|---|---|---|
| 6,401,117 | B1 * | 6/2002 | Narad et al. | 709/223 |
| 7,020,697 | B1 * | 3/2006 | Goodman et al. | 709/223 |
| 7,174,466 | B2 * | 2/2007 | Cuenod et al. | 713/193 |

\* cited by examiner

*Primary Examiner* — Hosuk Song
(74) *Attorney, Agent, or Firm* — IP Strategies

(57) ABSTRACT

A method of determining that protected software is running in a virtualized environment includes obtaining a set of baseline measurements of system call timings in native operating system environments. Statistical thresholds are established based on the baseline measurements such that there is a predetermined probability that protected software running in a native environment will experience system call durations that exceed the thresholds. The protected software is analyzed and instructions are incorporated within the software such that particular system calls, demonstrated to be differentiating using the set of baseline measurements and the threshold analysis, are executed during the normal running of the protected software. The incorporated instructions are used to estimate the parameter values that are to be compared with the established statistical thresholds. Repeated comparisons of the estimates obtained during the normal running of the protected software are executed to determine whether the software is running in a virtualized environment.

25 Claims, 3 Drawing Sheets

SYSTEM AND METHOD OF GENERICALLY DETECTING THE PRESENCE OF EMULATED ENVIRONMENTS

CROSS-REFERENCE TO RELATED APPLICATION

This is related to, and claims the benefit under 35 USC §119(e) of U.S. Provisional Application for Patent No. 60/821,676, which was filed on Aug. 7, 2006.

FIELD OF THE INVENTION

The present invention is related to the field of detection of emulated or otherwise synthetic or instrumented environments. More specifically, the present invention is directed to a system and method of detecting that a piece of software is being executed in an emulated or synthetic environment, where the developers of the software have no prior knowledge of the properties of the altered environment.

BACKGROUND OF THE INVENTION

Computer software often contains items of significant commercial value. For example, the field of Digital Rights Management (DRM) often concerns itself with protecting content that is digitally transmitted with perfect fidelity from machine to machine. Movies, music and e-books are all examples of the type of content that is commonly used in untrusted environments. In each case, there are instances where the intellectual property owner wishes to control how the content is used and/or copied.

One of the most powerful techniques for the theft of protected content is to execute the software managing it in an emulated or otherwise instrumented environment. If the software cannot detect that the environment is synthetic, the protected content may be stolen or the software reverse-engineered.

In addition to this, emulated environments have been suggested as a method of implementing a "rootkit" on a machine (essentially, the rootkit emulates a real environment, in which all other programs run). Currently, there are few ways of reliably detecting these rootkits, leaving a significant vulnerability for users who are unable to determine that their machines have been compromised.

Finally, there are important defense implications for building software that is difficult to reverse engineer. As our information infrastructure increases its battlefield penetration, it becomes clear that devices with significant information assets on them will fall into unfriendly hands. The resilience of these devices to reverse engineering is paramount. Similarly, embedded systems such as aircraft radar or missile guidance systems that get sold to foreign powers must be protected from reverse engineering, lest the exposure of important intellectual property compromises the integrity of defense systems.

As software can only interact with its environment via the CPU it is executing on, a carefully-designed emulated environment can appear to be identical to a "real" execution environment, as all function/system calls the software makes can be "spoofed" to hide the presence of the synthetic environment. Furthermore, such spoofing need not operate at a system call level—for example, in U.S. Pat. No. 7,162,715 a system is described that can preemptively intercept instructions at the CPU level. Similarly, new technologies embedded within CPUs make virtualization an easy task. Clearly, a reliable method of detecting such emulated and/or instrumented environments is of need.

SUMMARY OF THE INVENTION

According to an aspect of the invention, a method of determining that protected software is running in a virtualized environment includes obtaining a set of baseline measurements of system call timings for the protected software in native operating system environments with a mix of system loads. Statistical thresholds are established based on the baseline measurements such that there is a predetermined probability that protected software running in a native environment will experience system call durations that exceed these thresholds. The protected software is analyzed with respect to the established statistical thresholds, to provide a threshold analysis. Instructions are incorporated within the protected software such that particular system calls, demonstrated to be differentiating using the set of baseline measurements and the threshold analysis, are executed during the normal running of the protected software. The incorporated instructions are used to estimate the parameter values that are to be compared with the established statistical thresholds. Repeated comparisons of the estimates obtained during the normal running of the protected software are executed, and it is determined whether the protected software is running in a virtualized environment, based on results of the repeated comparisons.

The virtualized environment can be an emulated environment.

Obtaining a set of baseline measurements can include updating a set of baseline measurements.

The method can also include executing a decision algorithm that increases a probability of a correct determination. For example, the decision algorithm can include a requirement that a comparison of the estimates results in exceeding the threshold a predetermined percentage of times.

The baseline measurements of system call timings can be based at least in part on examination of variation in durations of system calls.

The baseline measurements of system call timings can be based at least in part on statistical distributions of system calls.

The baseline measurements of system call timings can be based at least in part on one of transformations of system call arrivals and system call timings. For example, the transformations can include at least one of z-transforms and Fourier transforms.

The baseline measurements of system call timings can be based at least in part on timing variation of non-system calls.

The baseline measurements of system call timings can be based at least in part on temporal distribution of system calls.

The method can also include examining delays brought about by at least one physical process on a machine running the protected software in order to determine disk geometry and spin rate of a hard drive in communication with the machine. For example, the physical process can include hard drive seek time.

The baseline measurements of system call timings can be based at least in part on temporal distribution of non-system calls.

The baseline measurements of system call timings can be based at least in part on the distribution of the durations of non-system calls.

The baseline measurements of system call timings can be based at least in part on noise in timing of at least one of system calls and non-system calls The baseline measurements of system call timings can be based at least in part on changes in timing of interaction of two different threads.

The method can also include running an emulation program interacts with an external system to provide an external measure of elapsed time. For example, the external system can be a remote network server not under the control of the emulation program.

The baseline measurements of system call timings can be based at least in part on changes in interaction of at least two different processes.

The method can also include measuring passage of real time by occurrence of external events. For example, the external events can include arrival of network traffic The method can also include measuring passage of real time by occurrence of internal events. For example, the internal events include at least one of a measured speed of spin of a disk and drive seek times of a machine running the protected software.

According to another aspect of the invention, a computer-readable storage medium includes instructions adapted to cause a computer to execute the method of the invention.

According to another aspect of the invention, a system includes a computer processor and the computer-readable storage medium of the invention.

BRIEF DESCRIPTION OF THE DRAWINGS

The present invention will be understood by reference to the drawing, wherein.

DETAILED DESCRIPTION OF THE INVENTION

The present invention uses properties of the timing of system calls to identify a particular environment. Deviations from this known environment are deemed to be malicious, and the program can modify its behavior accordingly. Specifically, the system uses cumulative properties related to the timing of certain operations to determine if the system is being emulated or otherwise modified from its "normal" operation. The system does not simply examine the magnitude of different system call times; instead it examines the distribution of values over a period of time from one or more system calls.

The power of the technique is that it is very difficult to spoof nuances in the timing results on a system, as it is computationally hard to modify all possible sources of timing data. For example, while it is trivial for an emulator to modify the speed of the system clock, it is difficult to accurately simulate changes to the refresh rate of the monitor, the speed of rotation of the fixed disk, or the operation of the system scheduler. Thus, inconsistencies—both cumulative and isolated—in timing can indicate the presence of a synthetic environment.

Figure 1A:
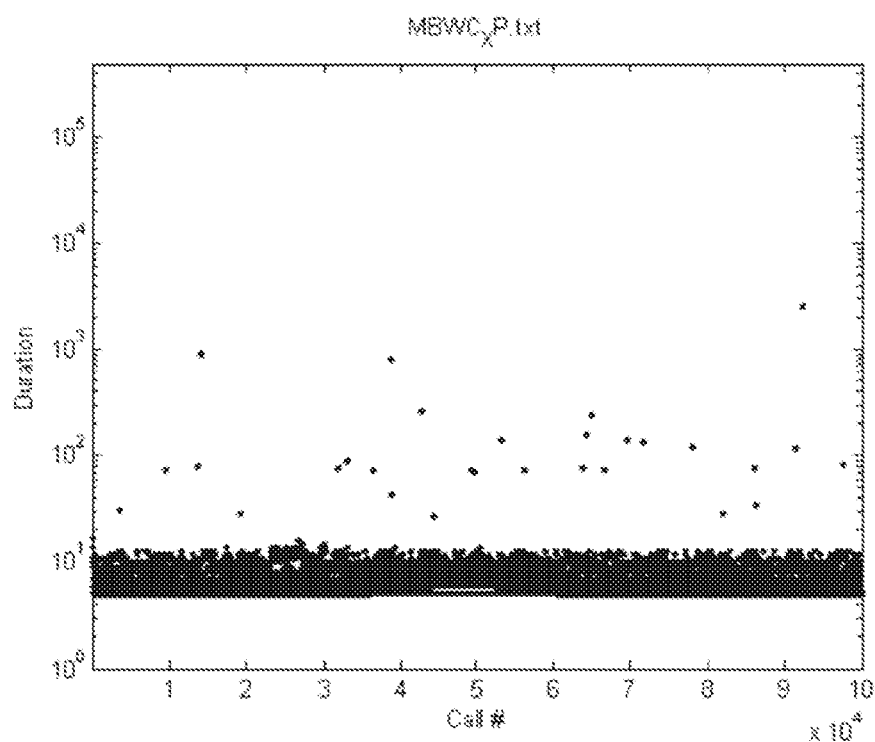
FIG. 1 is a graph displaying the variation of timing of a repeated systems call executed under Windows XP in a "real" environment.
Figure 1B:
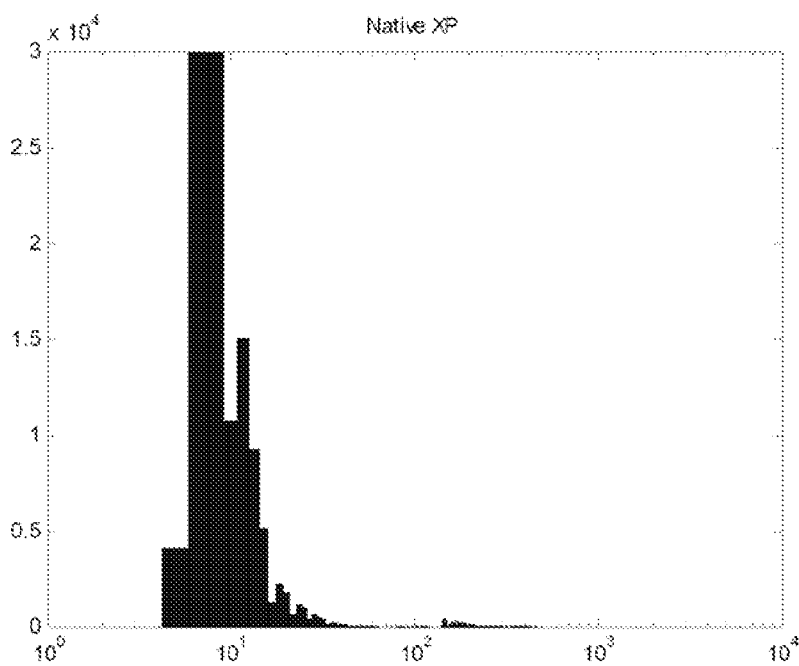

In addition to simply comparing timing measurements, emulated environments tend to have radically different patterns of distribution within a set of system call timings. In a "normal" environment (that is, an operating system such as Windows XP running natively on a machine) if a system call is repeated many times, the exact duration of the call will vary slightly depending on factors that are outside of the issued call, such as hardware or software interrupts or the state of the CPU memory cache. These variations in timing provide insight into the other functions the machine is performing—that is, other operations on the machine will tend to change the distribution of function/system call durations. Furthermore, the nature of these variations will depend on factors such as the load on the machine, the type of CPU and its cache, the performance of memory and the layout of various hardware devices integrated with the system. Error! Reference source not found. shows a trace from a typical machine, that is, the timing of repeated calls under Windows XP. FIG. 1(a) in particular is a plot showing the duration, on a log scale, of 10,000 calls. FIG. 1(b) is a histogram of those durations. Note the overall structure and distribution of the system call timings.

Now consider an emulation of a particular machine and operating system. In such an emulation, it is likely that both the magnitude of the times of system calls and their variation will change. While it is trivial to correct the magnitude of the calls simply by spoofing timing results, modeling the variation in calls under a variety of conditions is difficult because the emulator's own interactions with the machine it is executing on must be taken into account. For example, if we consider an emulator that is hosted on a Windows-type operating system, the emulator itself will experience timing variation as it interacts with its own host operating system. Thus, unless the emulator "fakes" every nuance of the "normal" timing variations, the emulated environment will be subtly altered. Furthermore, if the emulated environment is required to interact with any external system, such as a remote server, it is not possible to conceal changes in timing, as the emulated program will have access to an independent (and therefore untainted) source of timing data.

Figure 2A:
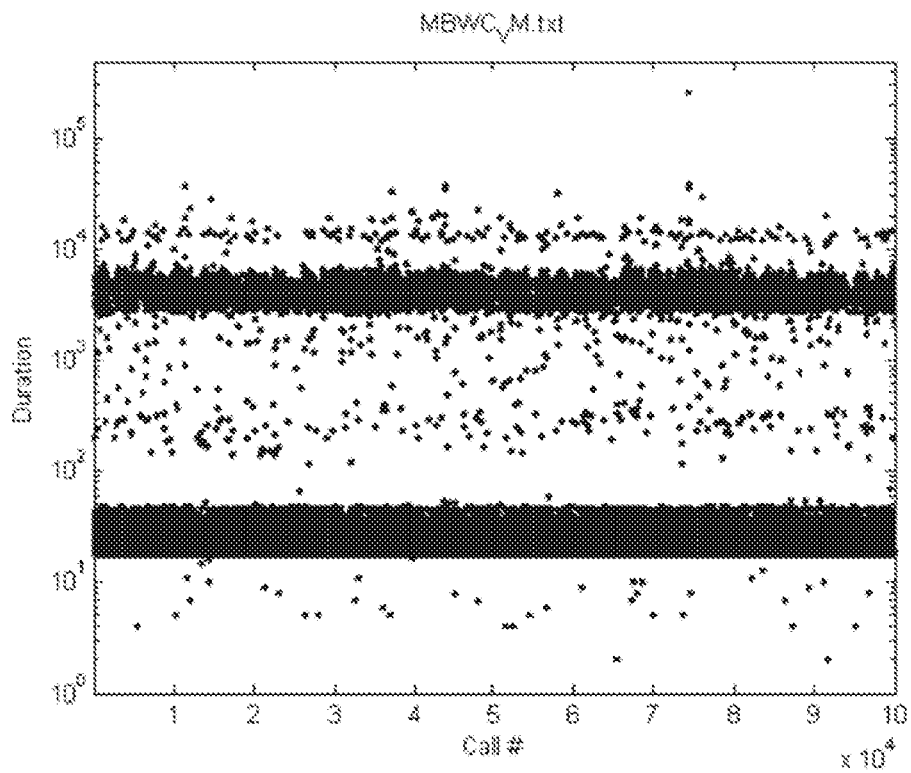
FIG. 2 is a set of graphs showing the same measurements taken under VMWare.
Figure 2B:
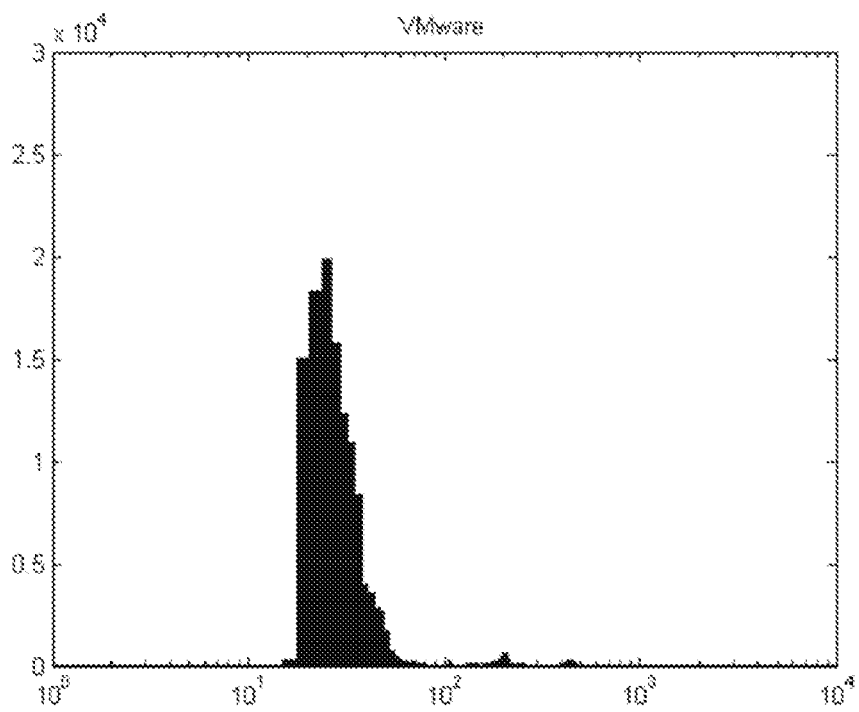
Figure 3A:
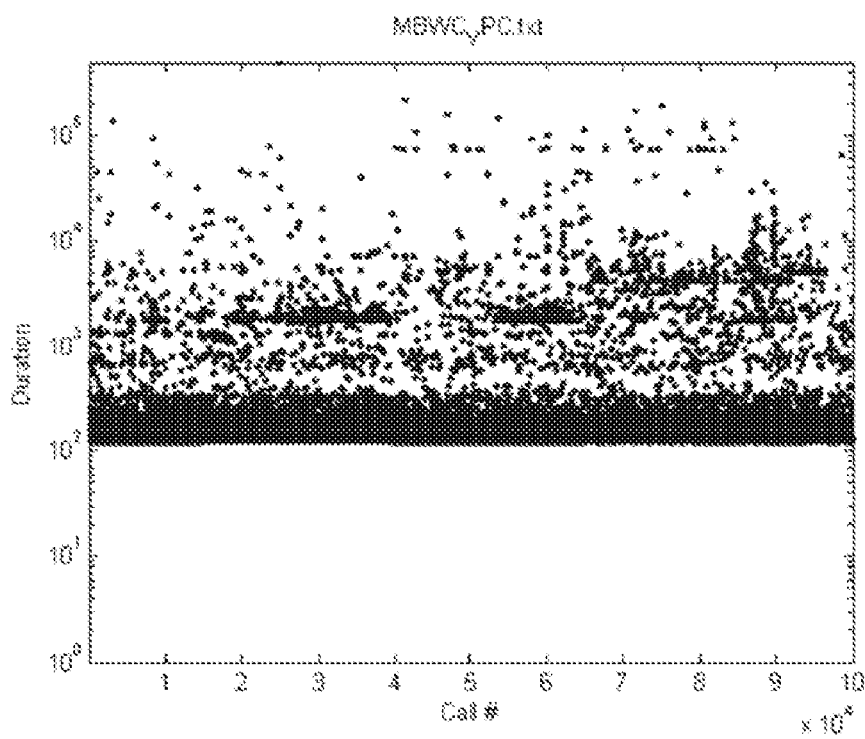
FIG. 3 is a set of graphs showing the same measurements taken under VirtualPC.
Figure 3B:
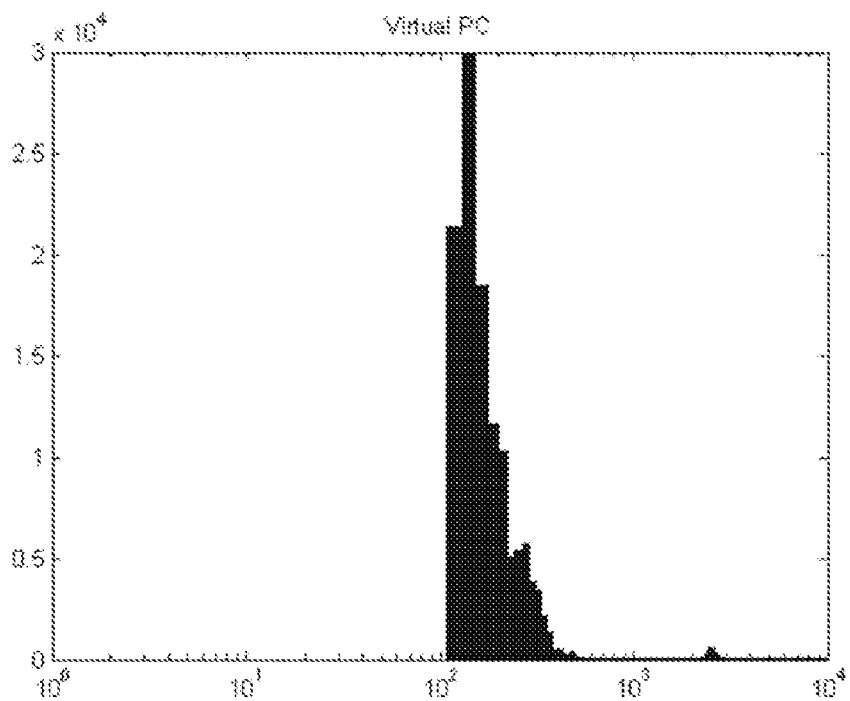

Error! Reference source not found. shows raw timing data of repeated system calls to the same function, captured from a program running under VMware. FIG. 2(a) in particular is a plot showing the duration, on a log scale, of 10,000 calls. FIG. 2(b) is a histogram of those durations. Likewise, Error! Reference source not found. shows raw timing data of repeated system calls to the same function, captured from a program running under Virtual PC. FIG. 3(a) in particular is a plot showing the duration, on a log scale, of 10,000 calls. FIG. 3(b) is a histogram of those durations. While changes to the magnitude of the calls are unremarkable, there is a dramatic change in the variation of the call timings (in contrast, for example, to those shown in FIG. 1(a)). We have demonstrated that this shift can be used to determine if the program is executing under a native operating system or an emulated one.

Analysis of call timing can be carried out in a number of different ways. Simple statistical properties, such as the standard deviation of repeated call timings can be used; however, it seems more likely that a mathematical model of the expected distribution would be employed. For example, one could construct a simple Markov model of call timing sequences (for example, by creating a grammar which represented moves up and down in timing, split into whether a change was large or small). Similarly, one could use Fourier analysis to determine underlying properties of the host system. In this discussion, these methods are simply exemplary and should not be viewed as restrictive; someone skilled in the art can clearly envision other implementations that do not do not depart from the spirit or scope of the invention.

Further, it is possible to use the interaction between both threads and processes to measure underlying properties of the host environment. As inter-process communication often involves kernel-mode calls, the distribution of these calls is dramatically changed by emulation of the underlying operating system.

Now that the invention has been described by way of a preferred embodiment, various modifications and improvements will occur to those of skill in the art. For example, the program can alternatively be designed to change its mode of behavior when an emulated or synthetic environment is detected. In another embodiment, the system could be placed in an embedded control device, and observe the variations in various analogue or digital inputs as a function of time. In still another embodiment, collection of timing data could be disseminated throughout the normal operation of the computer program, such that environment type determination could occur throughout the lifetime of the system. In yet another embodiment, changes to the timing information of repeated system calls could be used to determine other changes in the environment, unrelated to emulation, such as failure of a system component. Thus, it should be understood that the preferred embodiment is provided as an example and not as a limitation. The scope of the invention is defined by the appended claims.

We claim:

1. A method of determining that protected software is running in a virtualized environment, comprising the following actions performed by a processing device:
   a. obtaining a set of baseline measurements of system call timings for the protected software in native operating system environments with a mix of system loads;
   b. establishing statistical thresholds based on the baseline measurements such that there is a predetermined probability that protected software running in a native environment will experience system call durations that exceed the thresholds;
   c. analyzing the protected software with respect to the established statistical thresholds, to provide a threshold analysis;
   d. incorporating instructions within the protected software such that particular system calls, demonstrated to be differentiating using the set of baseline measurements and the threshold analysis, are executed during the normal running of the protected software;
   e. using the incorporated instructions to estimate the parameter values that are to be compared with the established statistical thresholds;
   f. executing repeated comparisons of the estimates obtained during the normal running of the protected software; and
   g. determining whether the protected software is running in a virtualized environment, based on results of the repeated comparisons.

2. A method as in claim 1, wherein the virtualized environment is an emulated environment.

3. A method as in claim 1, wherein obtaining a set of baseline measurements includes updating a set of baseline measurements.

4. A method as in claim 1, further comprising executing a decision algorithm that increases a probability of a correct determination.

5. A method as in claim 4, wherein the decision algorithm includes a requirement that a comparison of the estimates results in exceeding the threshold a predetermined percentage of times.

6. A method for detecting the presence of an emulated environment as in claim 1, wherein the baseline measurements of system call timings are based at least in part on examination of variation in durations of system calls.

7. A method as in claim 1, wherein the baseline measurements of system call timings are based at least in part on statistical distributions of system calls.

8. A method as in claim 1, wherein the baseline measurements of system call timings are based at least in part on one of transformations of system call arrivals and system call timings.

9. A method as in claim 8, wherein the transformations include at least one of z-transforms and Fourier transforms.

10. A method as in claim 1, wherein the baseline measurements of system call timings are based at least in part on timing variation of non-system calls.

11. A method as in claim 1, wherein the baseline measurements of system call timings are based at least in part on temporal distribution of system calls.

12. A method as in claim 1, wherein the baseline measurements of system call timings are based at least in part on temporal distribution/duration of non-system calls.

13. A method as in claim 1, wherein the baseline measurements of system call timings are based at least in part on noise in timing of at least one of system calls and non-system calls.

14. A method as in claim 1, further comprising running an emulation program interacts with an external system to provide an external measure of elapsed time.

15. A method as in claim 14, wherein the external system is a remote network server not under the control of the emulation program.

16. A method as in claim 1, wherein the baseline measurements of system call timings are based at least in part on changes in timing of interaction of two different threads.

17. A method as in claim 14, wherein the baseline measurements of system call timings are based at least in part on changes in interaction of at least two different processes.

18. A method as in claim 11, further comprising examining delays brought about by at least one physical process on a machine running the protected software in order to determine disk geometry and spin rate of a hard drive in communication with the machine.

19. A method as in claim 18, wherein the physical process includes hard drive seek time.

20. A method as in claim 14, further comprising measuring passage of real time by occurrence of external events.

21. A method as in claim 20, wherein the external events include arrival of network traffic.

22. A method as in claim 14, further comprising measuring passage of real time by occurrence of internal events.

23. A method as in claim 22, wherein the internal events include at least one of a measured speed of spin of a disk and drive seek times of a machine running the protected software.

24. A non-transitory computer-readable storage medium, comprising instructions adapted to cause a computer to execute the method of claim 1.

25. A system including a computer processor and the non-transitory computer-readable storage medium of claim 24.

* * * * *